(12) United States Patent
Cermelli et al.

(10) Patent No.: US 9,169,378 B2
(45) Date of Patent: Oct. 27, 2015

(54) POLYMER COMPOSITION FOR BLOW MOULDING

(71) Applicant: INEOS EUROPE AG, Vaud (CH)

(72) Inventors: Isabelle Cermelli, Sausset les Pins (FR); Luc Marie Ghislain Dheur, Brussels (BE); Fabian Siberdt, Braine-le-Chateau (BE)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/402,733

(22) PCT Filed: May 29, 2013

(86) PCT No.: PCT/EP2013/061051
§ 371 (c)(1),
(2) Date: Nov. 21, 2014

(87) PCT Pub. No.: WO2013/178673
PCT Pub. Date: Dec. 5, 2013

(65) Prior Publication Data
US 2015/0159002 A1    Jun. 11, 2015

(30) Foreign Application Priority Data

May 30, 2012   (EP) ..................................... 12170051

(51) Int. Cl.
*C08L 23/06* (2006.01)

(52) U.S. Cl.
CPC ........... *C08L 23/06* (2013.01); *C08L 2205/025* (2013.01); *C08L 2308/00* (2013.01)

(58) Field of Classification Search
CPC ................. C08L 23/06; C08L 23/0815; C08L 2205/025; C08L 2308/00; C08L 2314/02
See application file for complete search history.

(56) References Cited

U.S. PATENT DOCUMENTS 8,129,472 B2 *    3/2012   Turner .................... C08L 23/04
                                                                525/191
2010/0133714 A1    6/2010   Jaker et al.

FOREIGN PATENT DOCUMENTS

WO      WO 2006/018245 A1    2/2006

* cited by examiner

*Primary Examiner* — Nathan M Nutter
(74) *Attorney, Agent, or Firm* — Nixon & Vanderhye P.C.

(57) ABSTRACT

A polyethylene composition is disclosed which comprises from 45 to 55 wt % of an ethylene polymer (A) having a density of at least 968 kg/m$^3$, and from 55 to 45 wt % of an ethylene polymer (B) having a density of 920 to 955 kg/m$^3$, wherein the composition has a density of 952 to 961 kg/m$^3$, a high load melt index HLMI of 18-28 g/10 min, a ratio of HLMI/ML of 80-150, and a melt elastic modulus G' (G"=3000) of 1200-1600 Pa, where HLMI and ML$_2$ are measured according to ISO1133 at a temperature of 190° C. under loads of 21.6 kg and 2.16 kg respectively.

17 Claims, 1 Drawing Sheet

Die swell ratio - Die L/D = 30/2 mm at 190°C
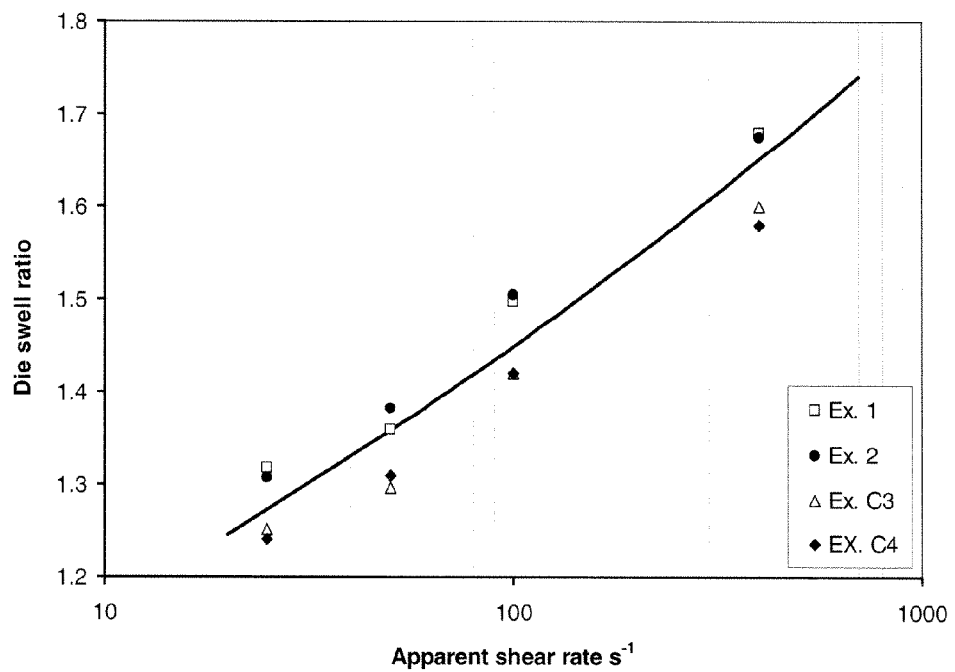
The solid line represents the equation DSR $\geq 0.94 \times SR^{0.094}$ with DSR = die swell ratio and SR = shear rate (s$^{-1}$)

POLYMER COMPOSITION FOR BLOW MOULDING

This application is the U.S. national phase of International Application No. PCT/EP2013/061051 filed May 29, 2013 which designated the U.S. and claims priority to European Patent Application No. 12170051.2 filed May 30, 2012, the entire contents of each of which are hereby incorporated by reference.

The present invention relates to novel ethylene polymer compositions and to articles made therefrom, particularly articles made by blow moulding.

Blow moulding is a manufacturing process by which hollow plastic parts can be formed. In this process a plastic tubular form, produced by either extrusion or injection moulding, is used to form the part. This form, called a parison or preform, is injected with air or another compressed gas. This expands the parison against the sides of the mould cavity, forming a hollow object with the size and shape of the mould. Blow moulding is often used to produce plastic vessels and containers such as bottles.

The requirements for polymer compositions intended for use in blow moulding applications are often centred around the aspects of composition processability and sufficient stiffness of the hollow articles produced. By using compositions with a higher rigidity, the wall thickness of the hollow moulded articles can be reduced, thus saving polymer mass per unit area and production/transportation costs due to e.g. bottles of lighter weight.

Furthermore, good processability, high stiffness and good mechanical properties should ideally be achieved together. However, compositions with a higher tensile modulus (i.e. stiffness) due to higher density often provide blow moulded articles with poorer mechanical properties such as environmental stress crack resistance (ESCR) and impact resistance.

Good processability in the blow moulding process is generally expressed in terms of melt strength and die swell. Polymers for blow moulding are generally required to exhibit good melt strength, no melt fracture, and good die swell within the constraints of the fabricator's equipment. Polymers which either have a relatively broad molecular weight distribution and/or show the presence of long chain branching (LCB) generally have higher melt strengths and die swell ratios. Thus the desired melt strength and die swell ratio can be represented by particular ranges of molecular weight distribution Mw/Mn (where Mw is the weight average molecular weight of the polymer, and Mn is the number average molecular weight of the polymer), melt storage modulus G' and melt flow ratio such as $HLMI/MI_2$. However these features are interrelated such that changing one can affect another, and finding the optimal combination to deliver the desired physical properties is not a trivial task.

Furthermore, meeting the die swell requirements set by the bottle fabricator is critical. If the die swell is too high the bottle weight generally increases. To counter the increase in bottle weight, changes to the fabrication conditions, such as narrowing the die gap, are made, and these can in turn lead to excessive flash and trimming problems. If the die swell is too low, additional features such as side handles on a container cannot be formed.

Polyethylene compositions suitable for blow moulding applications have in the past been made using chromium catalysts. However these can have problems with relatively poor ESCR. To overcome this, multimodal polyethylene compositions, that is to say compositions comprising a low molecular weight (LMW) component and a high molecular weight (HMW) component, made using Ziegler-Natta catalysts are today used as an alternative. The presence of a lower molecular weight fraction can improve the extrudability of the resin, whereas the presence of a higher molecular weight fraction ensures good mechanical properties. These multimodal compositions typically have improved mechanical properties such as stress crack resistance and impact resistance compared with resins made using chromium catalysts, but the multimodal compositions have relatively low die swell ratios and low melt strength. The improved mechanical properties of multimodal compositions make it possible to increase the density of the composition so as to either increase the rigidity or reduce the wall thickness of the hollow moulded articles compared to compositions made with chromium catalyst.

US 2009/0036610 discloses bimodal polyethylene compositions for blow moulding applications. The Examples have densities of 940 to 958 kg/m$^3$, high load melt index (HLMI) values between 5 and 82 g/10 min, and a ratio of HLMI to melt index $MI_2$ between 67 and 119. However none of the Examples has the specific combination of these three properties claimed in the present invention.

U.S. Pat. No. 6,194,520 discloses bimodal polyethylene compositions for blow moulding having an HLMI of at least 2 g/10 min and a ratio $HLMI/MI_2$ of at least 60. Example 3 has a density of 955 kg/m$^3$, an HLMI of 27 g/1 min, a ratio $HLMI/MI_2$ of 100, and a ratio of the two components in the bimodal polymer of 50:50. However there is no disclosure of G' (G"=3000) and the patent is mainly concerned with improving the environmental stress-crack resistance (ESCR) and processability of composition. This is achieved particularly through increasing the molecular weight distribution of the HMW component in the bimodal composition.

WO 2009/085922 discloses bimodal polyethylene compositions for blow moulding having a density of less than 955 kg/m$^3$ and an HLMI of at least 15 g/10 min. However all of the Examples have values of the ratio $HLMI/MI_2$ above about 150.

Commercial products exist on the market having HLMI in the range 22-27 g/10 min, $HLMI/MI_2$ ratios of about 60-70, and densities above 958 kg/m$^3$. As discussed above, these have relatively poor ESCR. Details of some of these are given in the Examples below.

An objective of the present invention is therefore to provide multimodal polyethylene compositions suitable for the preparation of hollow moulded articles having a good balance between processability (as represented by extrudability, die swell ratio and melt strength), high rigidity and also good mechanical properties, particularly environmental stress-crack resistance (ESCR) and impact resistance The present invention provides a polyethylene composition comprising from 45 to 55 wt % of an ethylene polymer (A) having a density of at least 968 kg/m$^3$, and from 55 to 45 wt % of an ethylene polymer (B) having a density of 920 to 955 kg/m$^3$, wherein the composition has a density of 952 to 961 kg/m$^3$, a high load melt index HLMI of 18-28 g/10 min, a ratio of HLMI/MI) of 80-150, and a melt elastic modulus G' (G"=3000) of 1200-1600 Pa, where HLMI and $MI_2$ are measured according to ISO1133 at a temperature of 190° C. under loads of 21.6 kg and 2.16 kg respectively.

Preferably the composition is in the form of a blow moulded article, more particularly a container such as a bottle.

Preferably the composition has a die swell ratio (DSR) as a function of shear rate (SR) satisfying the relationship $DSR \geq C \cdot (SR)^n$ where C=0.94 and n=0.094, when measured on a capillary rheometer using a Length/Diameter (L/D)=30/2 mm die at 190° C. over shear rates between 20 and 700 s$^{-1}$. Preferably C=0.935 and n=0.096, and most preferably C=0.935 and n=0.097.

It is preferred that the die swell ratio is equal to or greater than 1.44, preferably equal to or greater than 1.45, more preferably equal to or greater than 1.46 and most preferably equal to or greater than 1.47, when measured on a capillary rheometer using a L/D=30/2 mm die at 190° C. at a shear rate of 100 s$^{-1}$.

The compositions of the invention have good stress crack resistance, which means that in order to obtain acceptable stress crack resistance for a particular application the density can be higher, which gives improved rigidity. The selected range of storage modulus G' (at a loss modulus G" of 3000 Pa), also referred as G' (G"=3000) also provides the compositions of the invention with a good balance of mechanical properties and processability. G' (G"=3000) is linked to the long chain branching content and the molecular weight distribution of the resin, and affects the extrudability, melt elasticity and melt strength of a composition during the blow moulding process. A high G' corresponds to high melt strength, which is desirable for blow moulding. However if G' is too high mechanical properties such as impact resistance can be adversely affected, whereas if G' is too low there is insufficient melt strength for blow moulding and also poor die swell.

The HLMI of the polyethylene composition is preferably from 18 to 26, and most preferably from 19 to 25.

The ratio HLMI/MI$_2$ of the composition is preferably 85-140, more preferably 85-130.

The melt flow index MI$_2$ of the polyethylene composition is preferably between 0.1 g/10 min and 0.5 g/10 min, more preferably between 0.15 and 0.45 g/10 min and most preferably between 0.2 and 0.35 g/10 min. For the purposes of the present invention, melt flow indices HLMI and MI$_2$ are measured according to ISO1133 at a temperature of 190° C. under loads of 21.6 kg and 2.16 kg respectively.

The polyethylene composition preferably has a melt elastic modulus G' (G"=3000) of from 1250 to 1550 Pa, most preferably from 1300-1500 Pa.

The polyethylene composition preferably has a density of from 954 to 960 kg/m$^3$ and most particularly from 955 to 959 kg/m$^3$.

In one preferred embodiment the polyethylene composition has a density between 954 to 960 kg/m$^3$ an HLMI between 18 and 26 g/10 min, and a ratio HLMI/MI$_2$ of 85-140.

In the most preferred embodiment the polyethylene composition has a density between 955 to 959 kg/m$^3$ an HLMI between 19 and 25 g/10 min, and a ratio HLMI/MI$_2$ of 85-130.

The polyethylene composition may optionally further comprise a small prepolymerisation fraction in an amount of 10 wt % or less based on total polyethylene. Alternatively or additionally it may further comprise a fraction of very high molecular weight polymer, having a higher molecular weight than the aforementioned high molecular weight polymer, in an amount of 10 wt % or less based on total polyethylene.

It is generally preferred that the weight ratio of polymer (A) to polymer (B) in the polyethylene composition is between 45:55 and 55:45, more preferably between 46:54 and 54:46, and most preferably between 47:53 and 53:47, regardless of the presence or otherwise of any additional polyethylene fractions.

The polyethylene composition of the invention is multimodal, in that it comprises at least two polyethylene components. Preferably it is bimodal, which means that it contains significant amounts of only two polyethylene components. The form of the molecular weight distribution curve, i.e. the appearance of the graph of the polymer weight fraction as function of its molecular weight, of a multimodal polyethylene will show two or more maxima or at least be distinctly broadened in comparison with the curves for the individual fractions. For example, if a polymer is produced in a sequential multistage process utilising reactors coupled in series with different conditions in each reactor, each of the polymer fractions produced in the different reactors will have its own molecular weight distribution and weight average molecular weight. The molecular weight distribution curve of such a polymer comprises the sum of the individual curves of the fractions, typically yielding a curve for the multimodal polymer having a substantially single peak or two or more distinct maxima. A "substantially single peak" may not follow a Gaussian distribution, may be broader than a Gaussian distribution would indicate, or have a flatter peak than a Gaussian distribution. Some substantially singular peaks may have a tail on either side of the peak. In some embodiments it may be possible to mathematically resolve a "substantially single peak" in a molecular weight distribution curve into two or more components by various methods.

It is particularly preferred that ethylene polymer (A) is a homopolymer, and the ethylene polymer (B) is a copolymer of ethylene and a $C_4$-$C_8$ alpha-olefin.

The amount of polymer (A) present in the composition is preferably between 46 wt % and 54 wt % based on total polyethylene, more preferably between 47 wt % and 53 wt %. The amount of polymer (B) present in the composition is preferably between 46 wt % and 54 wt %, more preferably between 47 wt % and 53 wt %. These amounts correspond to the weight ratio of (A) to (B) in the case where these are the only two polyethylene fractions present in the composition. However as previously described, other polyethylene fractions may optionally be present in the composition: when the amounts of polymer (A) and polymer (B) are 47-53 wt % and 47-53 wt % respectively, it is preferred that the maximum amount of any prepolymer as previously described is 5 wt %, and the maximum amount of any very high molecular weight fraction as previously described is 5 wt %.

For the purposes of the present invention, the term "homopolymer" is understood to denote an ethylene polymer composed essentially of monomer units derived from ethylene and substantially devoid of monomer units derived from other polymerisable olefins. It may contain trace amount of units derived from other polymerisable olefins which are present as impurities in the feed or recycle streams of the polymerisation process or which are carried over between stages in a multistage process, but it should contain at least about 99.7% by mole of ethylene repeating units, based on all the repeating units present in the "homopolymer". The term "copolymer of ethylene and a $C_4$-$C_8$ alpha-olefin" is understood to denote a copolymer comprising monomer units derived from ethylene and monomer units derived from a $C_4$-$C_8$ alpha-olefin and, optionally, from at least one other .alpha.-olefin. The $C_4$-$C_8$ alpha-olefin can be selected from olefinically unsaturated monomers comprising from 4 to 8 carbon atoms, such as, for example, 1-butene, 1-pentene, 1-hexene, 3-methyl-1-butene, 3- and 4-methyl-1-pentenes and 1-octene. Preferred alpha-olefins are 1-butene, 1-hexene and 1-octene and more particularly 1-hexene. The other alpha-olefin which may also be present additional to the $C_4$-$C_8$ alpha-olefin is preferably selected from olefinically unsaturated monomers comprising from 3 to 8 carbon atoms, such as, for example, propylene, 1-butene, 1-pentene, 3-methyl-1-butene, 3- and 4-methyl-1-pentenes, 1-hexene and 1-octene.

The content in copolymer (B) of monomer units derived from $C_4$-$C_8$ alpha-olefin, hereinafter called comonomer content, is generally at least 0.2 wt %, in particular at least 0.4 wt %. The comonomer content of copolymer (B) is usually at most 5 wt %, preferably at most 4 wt %. Comonomer content in the overall composition is preferably in the range 0.2-2 wt %.

For the purposes of the present invention, the $C_4$-$C_8$ alpha-olefin content is measured by $^{13}C$ NMR according to the method described in J. C. Randall, JMS-Rev. Macromol. Chem. Phys., C29(2&3), p. 201-317 (1989), that is to say that the content of units derived from $C_4$-$C_8$ alpha-olefin is calculated from the measurements of the integrals of the lines characteristic of that particular $C_4$-$C_8$ alpha-olefin in comparison with the integral of the line characteristic of the units derived from ethylene (30 ppm). A composition composed essentially of monomer units derived from ethylene and a single $C_4$-$C_8$ alpha-olefin is particularly preferred.

In the preferred aspect of the invention, polymer (A) has an $MI_2$ of from 10 to 800, preferably from 20 to 600. A more preferred range of $MI_2$ for polymer (A) is from 40 to 400 g/10 min, and the most preferred range is from 40 to 150 g/10 min.

The ratio of HLMI to melt index Mb for polymer (A) is preferably 20 to 40, more preferably 25 to 35.

The ratio of HLMI to melt index $MI_5$ for polymer (A) is preferably 5 to 15, more preferably 8 to 13.

The ratio of HLMI to melt index Mb for polymer (B) is preferably 20 to 40, more preferably 25 to 35.

The ratio of HLMI to melt index $MI_5$ for polymer (B) is preferably 5 to 15, more preferably 8 to 13.

The selected ranges of $HLMI/MI_2$ and $HLMI/MI_5$ for polymers (A) and (B) provide the compositions of the invention with a good balance between mechanical properties and processability. If the melt flow ratios of the two polymers (A) and (B) are too low the resulting multimodal composition may have poor extrudability. However, if the melt flow ratios are too high mechanical properties such as impact resistance can be adversely affected.

The density of polymer (A) is preferably between 968 and 975 kg/m$^3$, more preferably between 969 and 974 kg/m$^3$, most preferably between 970 and 974 kg/m$^3$.

The density of copolymer (B) is preferably between 930 and 950 kg/m$^3$, most preferably between 940 and 950 kg/m$^3$.

If polymers (A) and (B) are made separately and then blended, it is possible to measure directly the melt index, density and comonomer content of both polymers. However, if the multimodal polymer is made in a multistage process in which one polymer is made prior to the other and then the second polymer is made in the presence of the first polymer, then the melt index, density and comonomer content of the second polymer cannot be measured, and instead for the purposes of this invention they are defined as below. The definitions below would also apply to a third or subsequent polymer (if one is present) which is made in the presence of the first two polymers.

All melt indices such as HLMI and $MI_2$ of the second (or third or subsequent) polymer are defined as being the value directly measured for the second (or third or subsequent) polymer when made separately under the same polymerisation conditions as used to make the multimodal composition. In other words, the second (or third or subsequent) polymer is made separately using the same catalyst and under the same polymerisation conditions as those employed in the second (or third or subsequent) reactor of the multimodal polymerisation, and its melt index is then measured.

The density of the second (or third or subsequent) polymer is defined as being that calculated from the relationship:

$$\text{density (composition)} = \sum_1^n x_n \cdot d_n$$

where x is the weight fraction of component n, d is the density of component n, and n is the number of polymers in the composition.

The comonomer content of the second (or third or subsequent) polymer is defined as being that calculated from the relationship:

$$\text{comonomer content (composition)} = \sum_1^n x_n \cdot c_n$$

where x is the weight fraction of component n, c is the comonomer content of component n, and n is the number of polymers in the composition.

If the polymer is made with a "multiple catalyst system" such as a bimetallic catalyst, it is possible to make both polymers (A) and (B) in the same reactor. In such a case it is not possible to measure directly the properties of either polymer (A) or polymer (B). Therefore in this case the properties of both polymers (A) and (B) are defined as being those obtained when the respective polymers are prepared separately using the individual catalysts of the "multiple catalyst system", and under the same polymerisation conditions as those employed for making the multimodal polymer composition.

The most preferred composition of the present invention has a density between 954 to 959 kg/m$^3$ and an HLMI between 19 and 25 g/10 min, and comprises from 47 to 53 wt % of an ethylene polymer (A) having a density of between 970 and 974 kg/m$^3$, and from 47 to 53 wt % of an ethylene polymer (B) having a density of between 940 and 950 kg/m$^3$, the ratio of (A):(B) also being from 47:53 to 53:47. Polymer (A) preferably has an $MI_2$ between 40 and 150 g/10 min.

The most preferred composition of the present invention preferably has a melt elastic modulus G' (G"=3000) of from 1250 to 1550 Pa, most preferably from 1300-1500 Pa, and a die swell ratio (DSR) as a function of shear rate (SR) satisfying the relationship $DSR \geq C \cdot (SR)^n$ where C=0.94 and n=0.094, preferably C=0.935 and n=0.096, and most preferably C=0.935 and n=0.097, when measured on a capillary rheometer using a Length/Diameter (L/D)=30/2 mm die at 190° C. over shear rates between 20 and 700 s$^{-1}$. Whilst the compositions of the invention may consist entirely of the polyethylene described above, the invention includes within its scope compositions comprising other components in addition to the polyethylene. In particular, the composition may contain conventional additives in an amount of up to 10 wt %, preferably up to 5 wt % and more preferably up to 3 wt % based on the total weight of the composition. Such additives include stabilizers (antioxidizing agents and/or anti-UV agents), antistatic agents and processing aids, as well as pigments. The composition may also contain up to 10 wt % of another polyolefin. However all compositions of the invention comprise a minimum of 45 wt % of polymer (A) and 45 wt % of polymer (B), and therefore the maximum combined amount of all other components including any prepolymer, very high molecular weight polymer, additives or other polyolefin (if present), is 10 wt %. Similarly, when the amounts of polymers (A) and (B) are both in the range 46-54 wt %, the maximum content of all other components is 8 wt %, and when the amounts of polymers (A) and (B) are both in the range 47-53 wt %, the maximum content of all other components is 6 wt %.

The preferred polyethylene composition of the invention may be produced by any of the methods known in the art, such as mechanically blending polymers (A) and (B) and optionally other polyethylenes, in situ formation of polymers (A) and (B) in the presence of a "multiple catalyst system", and formation of polymers (A) and (B) in a multistage process. Blending may be carried out in any conventional blending apparatus.

By a "multiple catalyst system" is meant a composition, mixture or system including at least two different catalyst compounds, each having the same or a different metal group, including a "dual catalyst," e.g., a bimetallic catalyst. Use of a multiple catalyst system enables a multimodal product to be made in a single reactor. Each different catalyst compound of the multiple catalyst system may reside on a single support particle, in which case a dual (bimetallic) catalyst is considered to be a supported catalyst. However, the term bimetallic catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerisation is conducted in the presence of the bimetallic catalyst system, i.e., the two collections of supported catalysts. Alternatively, the multiple catalyst system includes a mixture of unsupported catalysts in slurry form. One catalyst may be used to produce the HMW component, and the other may be used to produce the LMW component. The LMW catalyst is usually more responsive to chain termination reagents, such as hydrogen, than the HMW catalyst.

However the polyethylene composition of the invention is preferably obtained by a multistage ethylene polymerisation, typically using a series of reactors. A multistage process is a polymerisation process in which a polymer comprising two or more fractions is produced by producing at least two polymer fraction(s) in separate reaction stages, usually with different reaction conditions in each stage, in the presence of the reaction product of the previous stage. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc.

It is preferred that the polymer (A) is produced in the first reactor, and that polymer (B) is produced in a subsequent reactor. However this order may be reversed. If the multimodal composition includes a prepolymer, this is made in a reactor preceding the first reactor. It is preferred that all reactors are slurry reactors, in particular slurry loop reactors.

In a particularly preferred multistage polymerisation process:

in a first reactor, ethylene is polymerized in slurry in a first mixture comprising a diluent, hydrogen, a catalyst based on a transition metal and a cocatalyst, so as to form from 45 to 55% by weight with respect to the total weight of the composition of an ethylene homopolymer (A);

said first mixture is withdrawn from said reactor and is subjected to a reduction in pressure, so as to degas at least a portion of the hydrogen to form an at least partially degassed mixture, and said at least partially degassed mixture, together with ethylene and a $C_4$-$C_8$ alpha-olefin and, optionally, at least one other alpha.-olefin, are introduced into a subsequent reactor and the slurry polymerization is carried out therein in order to form from 45 to 55% by weight, with respect to the total weight of the composition, of a copolymer of ethylene and of $C_4$-$C_8$ alpha-olefin.

The invention also provides a process for obtaining a blow-moulded article, comprising the steps of polymerising ethylene and optionally comonomer, compounding the polyethylene composition, and then blow moulding the composition to form an article. The step of polymerising ethylene preferably forms a multimodal polyethylene.

The catalyst employed in the polymerisation process to produce the polyethylene compositions of the invention may be any catalyst(s) suitable for preparing such polyethylenes. If the polyethylene is multimodal, it is preferred that the same catalyst produces both the high and low molecular weight fractions. For example, the catalyst may be a Ziegler-Natta catalyst or a metallocene catalyst. Preferably the catalyst is a Ziegler-Natta catalyst.

In the case of a Ziegler-Natta catalyst, the catalyst used comprises at least one transition metal. Transition metal means a metal of groups 4, 5 or 6 of the Periodic Table of elements (CRC Handbook of Chemistry and Physics, 75th edition, 1994-95). The transition metal is preferably titanium and/or zirconium. A catalyst comprising not only the transition metal but also magnesium is preferably utilised. Good results have been obtained with catalysts comprising:

from 5 to 30%, preferably from 6 to 22%, most preferably 8 to 16% by weight of transition metal,
from 0.5 to 20%, preferably from 2 to 18%, most preferably 5 to 15% by weight of magnesium,
from 20 to 70%, preferably from 30 to 65%, most preferably 40 to 60% by weight of halogen, such as chlorine,
from 0.1 to 10%, preferably from 2 to 8%, most preferably 0.5 to 5% by weight of aluminium;

the balance generally consisting of elements arising from products used for their manufacture, such as carbon, hydrogen and oxygen. These catalysts are preferably obtained by coprecipitation of at least one transition metal composition and a magnesium composition by means of a halogenated organoaluminium composition. Such catalysts are known, they have notably been described in patents U.S. Pat. No. 3,901,863, U.S. Pat. No. 4,292,200 and U.S. Pat. No. 4,617,360. The catalyst is preferably introduced only into the first polymerisation reactor, i.e. there is no introduction of fresh catalyst into the further polymerisation reactor. The amount of catalyst introduced into the first reactor is generally adjusted so as to obtain an amount of at least 0.5 mg of transition metal per liter of diluent. The amount of catalyst usually does not exceed 100 mg of transition metal per liter of diluent.

Particularly preferred catalysts contain 5 to 30% by weight of transition metal, 0.5 to 20% by weight of magnesium, 20 to 70% by weight of chlorine and 0.1 to 10% by weight of aluminium, and have a residual organic radical content in the precipitated catalyst of less than 35 wt %. These catalysts are also obtained by coprecipitation of at least one transition metal compound and a magnesium compound by means of a halogenated organoaluminium compound, but with a ratio of transition metal to magnesium of no more than about 1:1. They may optionally further comprise an electron donor. They are described in more detail in our own EP 703247B. Most preferred catalysts have the following composition:

Transition metal from 8 to 16% by weight.
Magnesium content from 5 to 15% by weight.
Chlorine content from 40 to 60% by weight.
Aluminium content less than 5% by weight.
Residual organic content less than 35% by weight.
Total alkyl benzoate content less than 20% by weight.

The cocatalyst utilised in the process is preferably an organoaluminium compound. Unhalogenated organoaluminium compounds of formula $AlR_3$ in which R represents an alkyl grouping having from 1 to 8 carbon atoms are preferred. Particularly preferred are triethylaluminium and triisobutylaluminium.

In the particularly preferred multistage polymerisation process described above for producing the composition of the invention it is preferred to utilise a Ziegler-Natta catalyst. In such a case the polymerisation temperature is generally from 20 to 130° C., preferably from 60° C. to 115° C., and more preferably from 75° C. to 110° C. The total pressure at which the process is effected is in general from 0.1 MPa to 10 MPa. In the first polymerisation reactor, the total pressure is preferably at least 2.5 MPa. Preferably, it does not exceed 5 MPa. In the further polymerisation reactor, the total pressure is preferably at least 1.3 MPa. Preferably, it does not exceed 4.3 MPa.

The period of polymerisation in the first reactor and in the further reactor is in general at least 20 minutes, preferably at least 30 minutes. It does not usually exceed 5 hours, preferably not 3 hours.

In this particularly preferred process, a slurry comprising the resin of the invention is collected at the outlet of the further polymerisation reactor. The composition may be separated from the suspension by any known means. Usually, the suspension is subjected to a pressure expansion (final expansion) so as to eliminate the diluent, the ethylene, the alpha-olefin and any hydrogen from the composition.

Typically the compositions of the invention are compounded into pellets, which may optionally then be used in the manufacture of articles. Compounding equipment and conditions are well known to those skilled in the art.

The compositions made according to the invention can be mixed with the usual processing additives for polyolefins, such as stabilizers (antioxidizing agents and/or anti-UV agents), antistatic agents and processing aids, as well as pigments. Examples include calcium stearate or zinc stearate as an acid neutraliser, Irgafos 168 as a process antioxidant, and Irganox 1010 or 1076 as a thermal antioxidant, and hydrated metal salts such as magnesium chloride to reduce the yellow index of the polymer.

EXAMPLES

The meanings of the symbols used in these examples and the units expressing the properties mentioned and the methods for measuring these properties are explained below.

Melt Indexes

Melt indexes are determined according to ISO1133 and are indicated in g/10 min. For polyethylenes a temperature of 190° C. is applied. $MI_2$ is determined under a load of 2.16 kg and HLMI is determined under a load of 21.6 kg.

Density

Density of the polyethylene was measured according to ISO 1183-1 (Method A) and the sample plaque was prepared according to ASTM D4703 (Condition C) where it was cooled under pressure at a cooling rate of 15° C./min from 190° C. to 40° C.

Dynamic Rheological Analysis

Dynamic rheological measurements are carried out, according to ASTM D 4440, on a dynamic rheometer (e.g., ARES) with 25 mm diameter parallel plates in a dynamic mode under an inert atmosphere. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

Measurement of Melt Elastic Modulus G' (G"=3000)

The frequency sweep (FS) experiment was then carried out at 190° C. using the above appropriately selected strain level between dynamic frequencies range of $10^{-2}$ to 100 rad/s, under nitrogen. The dynamic rheological data thus measured were then analysed using the rheometer software (viz., Rheometrics RHIOS V4.4 or Orchestrator Software) to determine the melt elastic modulus G' (G"=3000) at a reference melt viscous modulus (G") value of G"=3000 Pa. If necessary, the values were obtained by interpolation between the available data points using the Rheometrics software.

The term "Storage modulus", G'($\omega$), also known as "elastic modulus", which is a function of the applied oscillating frequency, $\omega$, is defined as the stress in phase with the strain in a sinusoidal deformation divided by the strain; while the term "Viscous modulus", G"($\omega$), also known as "loss modulus", which is also a function of the applied oscillating frequency, $\omega$, is defined as the stress 90 degrees out of phase with the strain divided by the strain. Both these moduli, and the others linear viscoelastic, dynamic rheological parameters, are well known within the skill in the art, for example, as discussed by G. Marin in "Oscillatory Rheometry", Chapter 10 of the book on Rheological Measurement, edited by A. A. Collyer and D. W. Clegg, Elsevier, 1988.

ESCR

Environmental stress crack resistance (ESCR) is determined by Full Notch Creep Test (FNCT) performed as described in ISO 16770:2004 at 50° C. under 7 MPa stress on 6×6 mm specimens taken from compression moulded plates obtained according to ISO 291:1997. The specimens are notched in their mid-length on all four sides (perpendicularly to the further tensile stress direction) with a very sharp razor blade; the notches are 1.0 mm deep. Notched samples are then immersed in a stirred mixture of water containing 2 wt % Arkopal N100 at 50° C., under a constant load of 7 MPa. The failure time and mode (brittle failure must be observed for a representative stress crack resistance test) are recorded.

Impact Resistance

Notched Charpy Impact Resistance was measured according to ISO 179-1/1eA (2000) at a temperature of 23° C. on type 1 specimens (80×10×4 mm) taken from compression moulded plates obtained according to ISO 291:1997 and notched with a Type A notch.

Die Swell Ratio

Die swell is measured using a Göttfert RT500 capillary rheometer, with a barrel diameter of 9.55 mm, and a Length (L)/Diameter(D°)=30/2 mm die with an entrance angle of 180°, at a temperature of 190° C. The extrudate diameter (D) at a given shear rate is measured and recorded at 95 mm below the die exit by a laser diametric system. To minimize the gravity effect, the extrudate length is maintained at 95 mm at all times, with a cutting system installed at 45 mm below the die exit. That is, at a given shear rate, the extrudate is first cut at 45 mm below the die exit and then allowed to extrude to 95 mm in length where its diameter is measured by the laser diametric system. Once the diameter has been measured, the system automatically activates the cutter which cuts the extrudate at 45 mm below the die exit. The process repeats for all shear rates where the die swell is always measured at end of an extrudate which is maintained at 95 mm in length (below the die exit).

A sufficient quantity of pellet is introduced in the rheometer. Once the sample has reached equilibrium the capillary rheometer is set to the desired starting shear rate (20 s$^{-1}$). The extrudate diameter is used to calculate the die swell for a given shear rate according to the following equation:

Die swell ratio=diameter of the extrudate($D$,mm)/ diameter of the die($D°$,mm)

The shear rate is then increased and exrudate diameters are recorded at given shear rates until flow instability is observed, at which point the measurements are stopped.

Tensile Modulus

Tensile modulus was measured according to ISO 527 on ISO IBA specimen at 23° C. at a strain rate of 2 mm/min. The tensile modulus is the slope of a secant line between 0.05% and 0.25% strain on a stress-strain plot.

Gel Permeation Chromatography Analysis for Molecular Weight Distribution Determination Apparent molecular weight distribution and associated averages, uncorrected for long chain branching, were determined by Gel Permeation (or Size Exclusion) Chromatography according to ISO16014-1, ISO 16014-2 and 16014-4, using a PL 220 of Polymer Laboratories with 4 columns WATERS STYRAGEL HMW 6E of 30 cm length and 1 guard column Waters Styragel 4.6×30 mm and a differential refractometer detector.

The solvent used was 1,2,4 Trichlorobenzene at 150° C., stabilised with BHT, of 0.2 g/liter concentration. Polymer solutions of 0.8 g/liter concentration were prepared at 160° C. for one hour with stirring only at the last 30 minutes. The nominal injection volume was set at 400 μl and the nominal flow rate was 1 ml/min.

A relative calibration was constructed using 13 narrow molecular weight linear polystyrene standards:

| PS Standard | Molecular Weight |
|---|---|
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters:

kPS=1.21 10-4 dl g-1 αPS=0.707, kPE=3.92.10-4 dl g-1, αPE=0.725.

The calibration curve Mw Pp=f(V) was then fitted with a first order linear equation. All the calculations are done with Empower 2 software from Waters.

A) Catalyst

Magnesium diethoxide was reacted with titanium tetrabutoxide for 7 hours at 140±5° C. in an amount such that the molar ratio of titanium to magnesium was equal to 1. The reaction product thus obtained (mixed alcoholate) was subsequently contacted with ethylbenzoate (EB) at ambient temperature for at least 6 hours. The mixture of mixed alcoholate and ethyl benzoate was then reacted with aluminium isobutyl dichloride (IBADIC) in two steps, both at 45° C. The amount of IBADIC introduced at the end of the first step corresponded to a IBADIC/Mg ratio of 4.5 mole/mole. A partial elimination of the chlorination by-products was effected by decantation of the solid and removal of the supernatant liquid. The amount of IBADIC introduced at the end of the second chlorination step corresponded to a IBADIC/Mg ratio of 2.5 mole/mole. After the second chlorination step, the slurry was aged at 60° C. for 45 minutes, and subsequently cooled at ambient temperature (less than 35° C.). The reaction by-products were then removed from the slurry by washing the solid with polymerisation grade hexane. The catalyst thus obtained, collected from the suspension, comprised (% by weight):Ti: 13; Cl: 51; Al: 2; Mg: 7. The concentration of total benzoates in the catalyst was about 10 wt %.

B) Composition

The manufacture of a composition comprising ethylene polymers was carried out in suspension in isobutane in two loop reactors with 200 L and 300 L volume respectively, connected in series and separated by a device which makes it possible continuously to carry out the reduction in pressure.

Isobutane, ethylene, hydrogen, triethylaluminium and the catalysts were continuously introduced into the first loop reactor and the polymerization of ethylene was carried out in this mixture in order to form the homopolymer (A). This mixture, additionally comprising the homopolymer (A), was continuously withdrawn from the said reactor and was subjected to a reduction in pressure (~50° C., 0.6 MPa), so as to remove at least a portion of the hydrogen. The resulting mixture, at least partially degassed of hydrogen, was then continuously introduced into a second polymerization reactor, at the same time as ethylene, hexene, isobutane and hydrogen, and the polymerization of the ethylene and of the hexene was carried out therein in order to form the ethylene/l-hexene copolymer (B). The suspension comprising the composition comprising ethylene polymers was continuously withdrawn from the second reactor and this suspension was subjected to a final reduction in pressure, so as to evaporate the isobutane and the reactants present (ethylene, hexene and hydrogen) and to recover the composition in the form of a powder, which was subjected to drying in order to complete the degassing of the isobutane.

The polymer powder was then transferred to a Werner and Pfleiderer ZSK40 twin-screw extruder and compounded with an additive package described below. Additives incorporated with the resins in the Table below during compounding were 1000 ppm of calcium stearate (acid neutraliser), 800 ppm of Irgafos 168 (process antioxidant), and 400 ppm of Irganox 1010 (thermal antioxidant).

The other polymerisation conditions and copolymer properties (as measured on pellets) are specified in Table 1. The properties of the compositions are presented in Table 2. Table 3 provides die swell ratios for the compositions at various shear rates, with a graphical representation given in FIG. 1.

Comparative example C3 and C4 are commercially available resins from LyondellBasell Industries (Hostalen ACP 6031D and ACP 5831D, respectively). Comparative example C5 is a commercially available resin from Total Petrochemicals (BM593).

TABLE 1 polymerisation conditions

| EXAMPLE | 1 | 2 |
|---|---|---|
| Reactor 1 | | |
| C2 (g/kg) | 17.8 | 18.6 |
| H2/C2 (mole/mole) | 0.39 | 0.35 |
| T (° C.) | 90 | 90 |
| Residence time (h) | 1.56 | 1.56 |
| Reactor 2 | | |
| C2 (g/kg) | 21.5 | 29.8 |
| C6/C2 (mole/mole) | 0.28 | 0.30 |
| H2/C2 (mole/mole) | 0.019 | 0.020 |
| T (° C.) | 80 | 80 |
| Residence time (h) | 1.36 | 1.36 |

TABLE 2 polymer properties

| EXAMPLE | 1 | 2 | C3 | C4 | C5 |
|---|---|---|---|---|---|
| Properties of polymer fraction A | | | | | |
| wt % (A) | 54 | 50 | | | |
| $MI_2$(A) (g/10 min) | 70 | 59 | | | |
| Density (A) (kg/m$^3$) | 970 | 970 | | | |
| Properties of polymer fraction B | | | | | |
| Density (B) (kg/m$^3$)* | 946 | 945.4 | | | |
| Properties of polymer composition (after pelletisation) | | | | | |
| $MI_2$ (g/10 min) | 0.24 | 0.25 | 0.32 | 0.31 | 0.36 |
| HLMI (g/10 min) | 26 | 22 | 23 | 22 | 22 |
| $HLMI/MI_2$ | 106 | 90 | 71 | 71 | 61 |
| Density (kg/m$^3$) | 959.0 | 957.7 | 960.4 | 958.4 | 958.5 |
| G'(G" = 3000) (Pa) | 1508 | 1401 | 1044 | 1108 | 951 |
| $\eta^*_{100}$ (Pa · s) | 1568 | 1676 | 1677 | 1689 | 1656 |
| $\eta^*_{0.1}$ (Pa · s) | 35693 | 34180 | 27136 | 28573 | 24069 |
| Mn (kDa) | | 13 | 13 | 13 | 17 |
| Mw (kDa) | | 197 | 184 | 181 | 176 |
| Mz (kDa) | | 1093 | 888 | 811 | 727 |
| Mw/Mn | | 15.2 | 14.2 | 13.9 | 10.4 |
| ESCR (FNCT@7bar) (h) | 17 | 17 | 9 | 13 | 13 |
| Charpy impact (kJ/m$^2$) | 10.0 | 11.6 | 13.5 | 11.0 | 16.3 |
| Tensile modulus (MPa) | 1647 | 1446 | 1427 | 1407 | 1176 |

$\eta^*_{0.1}$ and $\eta^*_{100}$ are the complex viscosities measured in a dynamic rheometer at a shear rate of 0.1 and 100 rad/s, respectively.
*calculated

TABLE 3 die swell ratio at various shear rates

| | EXAMPLE | | | |
|---|---|---|---|---|
| | 1 | 2 | C3 | C4 |
| Shear rate (s$^{-1}$) | | Die Swell ratio | | |
| 25 | 1.32 | 1.31 | 1.25 | 1.24 |
| 50 | 1.36 | 1.38 | 1.30 | 1.31 |
| 100 | 1.50 | 1.51 | 1.42 | 1.42 |
| 400 | 1.68 | 1.68 | 1.60 | 1.58 |

The data in Tables 1-3 shows that the examples according to the invention provide compositions with improved environmental stress crack resistance (ESCR), greater stiffness as well as higher melt storage modulus G' (G"=3000 Pa) and higher die swell ratio compared to the comparative examples. The higher G' (G"=3000 Pa) of the inventive Examples is responsible for the superior die swell compared with the comparative Examples, and ESCR results are also superior, showing that G' (G"=3000 Pa) is not excessively high. The very good ESCR of the inventive Examples is despite their relatively high density: however the high density results in excellent stiffness as well, shown by the tensile modulus.

The invention claimed is:

1. Polyethylene composition comprising from 45 to 55 wt % of an ethylene polymer (A) having a density of at least 968 kg/m$^3$, and from 55 to 45 wt % of an ethylene polymer (B) having a density of 920 to 955 kg/m$^3$, wherein the composition has a density of 952 to 961 kg/m$^3$, a high load melt index HLMI of 18-28 g/10 min, a ratio of HLMI/MI$_2$ of 80-150, and a melt elastic modulus G'(G"=3000) of 1200-1600 Pa, where HLMI and MI$_2$ are measured according to ISO1133 at a temperature of 190° C. under loads of 21.6 kg and 2.16 kg respectively.

2. Polyethylene composition according to claim 1, which has an HLMI of from 18 to 26.

3. Polyethylene composition according to claim 1, which has an HLMI of from 19 to 25.

4. Polyethylene composition according to claim 1, wherein the ratio $HLMI/MI_2$ is 85-140.

5. Polyethylene composition according to claim 1, wherein the ratio $HLMI/MI_2$ is 85-130.

6. Polyethylene composition according to claim 1, wherein the melt flow index $MI_2$ is between 0.1 g/10 min and 0.5 g/10 min.

7. Polyethylene composition according to claim 1, wherein the melt flow index $MI_2$ is between 0.15 g/10 min and 0.45 g/10 min.

8. Polyethylene composition according to claim 1, wherein the melt flow index $MI_2$ is between 0.2 g/10 min and 0.3 g/10 min.

9. Polyethylene composition according to claim 1, which has a melt elastic modulus G'(G"=3000) of from 1250 to 1550 Pa.

10. Polyethylene composition according to claim 1, which has a melt elastic modulus G'(G"=3000) is from 1300 to 1500 Pa.

11. Polyethylene composition according to claim 1, which has a density of from 954 to 960 kg/m$^3$.

12. Polyethylene composition according to claim 1, which has a density of from 955 to 959 kg/m$^3$.

13. Polyethylene composition according to claim 1, which has a die swell ratio (DSR) as a function of shear rate (SR) satisfying the relationship $DSR \geq C \cdot (SR)^n$ where C=0.94 and n=0.094, when measured on a capillary rheometer using a Length/Diameter (L/D)=15/1 mm die at 190° C. over shear rates between 20 and 700 s$^{-1}$.

14. Polyethylene composition according to claim 1, which has a die swell ratio equal to or greater than 1.44, when measured on a capillary rheometer using a Length/Diameter (L/D)=15/1 mm die at 190° C. at a shear rate of 100 s$^{-1}$.

15. Polyethylene composition according to claim 1, which has a density between 954 to 959 kg/m$^3$ and an HLMI between 19 and 25 g/10 min, and comprises from 47 to 53 wt % of an ethylene polymer (A) having a density of between 970 and 974 kg/m$^3$, and from 47 to 53 wt % of an ethylene polymer (B) having a density of between 940 and 950 kg/m$^3$, the ratio of (A):(B) also being from 47:53 to 53:47.

16. Polyethylene composition according to claim 1, which is in the form of a blow moulded article.

17. Polyethylene composition according to claim 1, which is in the form of a blow moulded container.

* * * * *